Oct. 8, 1963
J. F. MACHEN
3,106,226
FLOW CONTROL VALVE
Filed Nov. 16, 1960
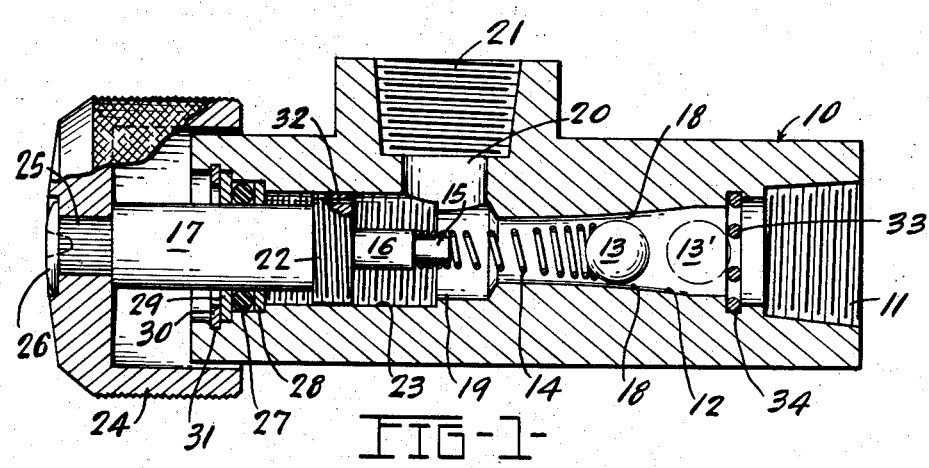
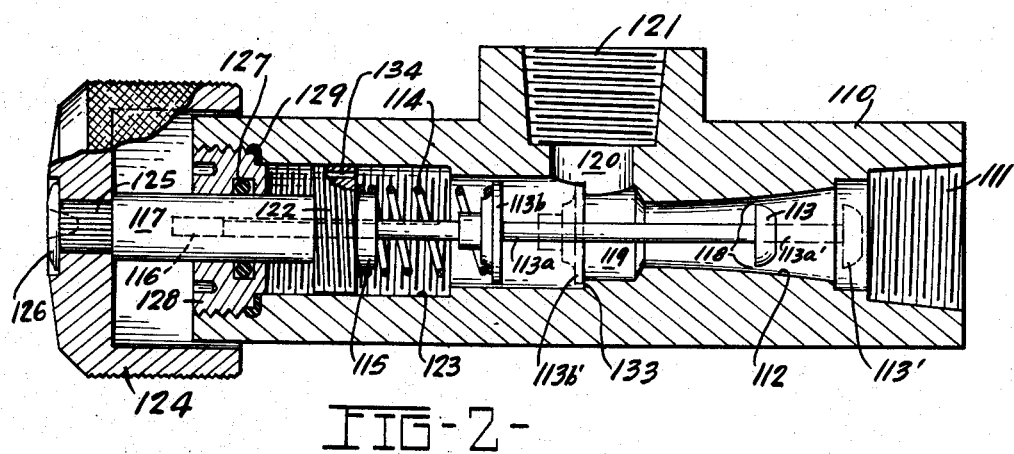
INVENTOR:
James F. Machen United States Patent Office 3,106,226
Patented Oct. 8, 1963

3,106,226
FLOW CONTROL VALVE
James F. Machen, 2495 Robinwood Ave., Toledo, Ohio
Filed Nov. 16, 1960, Ser. No. 71,866
3 Claims. (Cl. 138—45)

This invention relates to flow control valves and more specifically to adjustable pressure compensated flow regulating valves, primarily those which allow controlled flow in one direction and essentially free flow in the opposite direction.

In various applications involving fluid actuators, either linear or rotary, flow control valves are commonly used where speed control is desired. The common "flow" or "speed" control valve comprises a metering valve which restricts the flow to the actuator or fluid motor, and usually in the case of hydraulic or pneumatic cylinders, a check-valve which allows free flow from the actuator when the flow in the line is reversed on the return stroke.

Such a metering device is useful provided loads are steady or variations in speed are tolerable. However, when load variations result in considerable pressure variation across the flow control valve with resulting non-uniform flow and speed variations, such a valve becomes highly inadequate.

Valves which maintain constant flow regardless of pressure differential, so-called pressure compensated flow control valves, are large and expensive. Furthermore if free reverse flow is desired, a separate check-valve by-pass circuit is usually required in addition to the control valve.

Accordingly, it is an object of this invention to provide an adjustable valve which maintains constant metered flow, regardless of pressure differential and yet which permits essentially free flow upon reversal of flow.

Another object of this invention is to provide a flow control valve that is simple, compact, and inexpensive and yet dependable, rugged, and serviceable.

Another object of this invention is to provide a flow control valve which maintains a high degree of constancy over a wide range of pressure differentials.

Another object of this invention is to provide a flow control valve which is adjustable over a wide range of flows.

Another object of this invention is to provide a valve that is easily installed and operated and which requires little or no maintenance.

Other objects and advantages of the invention will be more apparent when the following description is taken in conjunction with the drawings, in which:

FIG. 1 is a sectional view of a preferred embodiment of this invention in which the metering element comprises a ball.

FIG. 2 is a sectional view of another embodiment of this invention in which the metering element consists of a poppet.

Referring to FIG. 1, valve body 10 is provided with tapped inlet 11 in communication with tapered bore 12. Ball 13 normally occupies a position in bore 12 against spring 14 mounted on pilot 15 projecting from extension 16 of stem 17.

Flow enters the valve through inlet 11, passes through annulus 18 formed by the clearance of ball 13 in bore 12, into chamber 19, through passage 20, and leaves through outlet 21.

Tapered bore 12 is shaped such that one unit of axial displacement of ball 13 in bore 12 causes the same percentage change in the effective flow area of annulus 18 regardless of the starting position of ball 13. Thus bore 12 is of larger diameter at its inlet end and approaches asymptotically a cylindrical bore having a diameter equal to the diameter of ball 13 at its outlet end.

The shape of tapered bore 12 may be determined theoretically by analytical methods. However, due to the complex nature of the flow problem involved and since actual performance by test is what truly governs the shape of the bore, a preferred procedure is to determine the required coordinates of the shape experimentally. One method of accomplishing this involves measuring the flow at a constant pressure differential for various axial ball positions in a similar bore. The flow for any ball position then will be directly proportional to the corresponding effective flow area. The proper bore configuration must provide the same percentage decrease in effective flow area per unit of axial ball travel toward the small end of the bore. To the extent that the bore under test deviates from this relationship, the design flow areas for this bore are adjusted accordingly.

Spring 14 is a variable rate spring which provides a balancing force for ball 13 such that at any displacement the area of annulus 18 remains in proper relationship to the pressure differential across ball 13 to maintain a constant flow. The proper force-displacement relationship required for spring 14 to fulfill this requirement may be determined analytically. However, again due to the complexity of the problem, and the practical problems associated with actual performance, a preferred method is to experimentally determine the necessary force-displacement relationship for constant flow conditions with the given bore and ball combination. A coil spring having this force-displacement relationship may then be used.

Such a non-linear coil spring may be obtained by winding it with the properly varied coil spacing or diameter, or both. When wound in this manner, the effective number of active coils of the spring, or its effective diameter, or both, varies with its deflection. Precision springs of this type may be wound on spring winding machines having the suitable cam arrangements.

Since bore 12 is shaped so that the same percentage change in effective flow area of annulus 18 occurs for each unit of axial displacement of ball 13, the flow maintained will depend only on the starting location of ball 13 if the proper spring 14 is used. When the starting location of ball 13 is closer to the inlet end of bore 12 the flow will be a constant flow of larger magnitude than when its starting location is somewhat closer to its outlet end.

For the purpose of adjusting the flow setting and changing the starting location of ball 13, threaded portion 22 of stem 17 mates threaded bore 23 in valve body 10. Thus when knob 24 is turned, the relationship of ball 13 and spring 14 in bore 12 is altered and the flow setting is changed to a different regulated value.

Knob 24 is pressed on knurled spline 25 of stem 17 and retained by riveted portion 26. Stem 17 is sealed to valve body 10 by O-ring 27 which is located and backed up by washers 28 and 29. The seal and washers are retained by retaining ring 30 in groove 31. Relief hole 32 is provided to prevent pressure build-up behind threaded stem portion 22.

This valve will permit relatively free flow in the reverse direction, fulfilling its function as a flow control valve for application to reciprocal fluid actuators. This is accomplished by the action of ball 13 which is loose in bore 12, and normally forced against spring 14 by the pressure causing flow. When flow is reversed, ball 13 moves freely to position 13' where it is prevented from further motion by G-shaped retainer 33 mounted in groove 34.

An important feature of the configuration of FIG. 1 is the use of a ball as the flow restricting element. Some definite advantages result from this feature. Balls having highly precise diameters and made of many materials are readily available at low cost. A ball is relatively unafrected by problems of erosion, while a knife-edged disc is subject to significant problems in this regard. A ball is self-locating and requires no guide means other than the wall of the bore. Furthermore, each time ball 13 returns to its position against spring 14 after flow reversal, it presents a new metering surface. These factors are very significant in fulfilling the objects of this invention.

The embodiment of this invention as illustrated in FIG. 2 incorporates valve body 110 having inlet 111 leading to tapered bore 112. Poppet 113 at the extremity of shaft 113a normally acts through shaft 113a to press flange 113b against spring 114 mounted on pilot 115 of stem 117.

The operation of this embodiment is basically similar to that of FIG. 1 in that flow enters inlet 111, passes through annulus 118 formed by the clearance of poppet 113 in bore 112, into chamber 119, through passage 120, and leaves through outlet 121.

Tapered bore 112 is again of such shape that one unit of axial displacement of poppet 113 causes the same percentage change in the effective flow area of annulus 118 regardless of the starting position of poppet 113.

Spring 114 is shown as a variable rate coil spring, however it may be of any construction provided the proper force-displacement relationship for constant flow is maintained. As one example, a rubber spring of the proper form works well for this purpose.

Pressure force on poppet 113 acts through shaft 113a and flange 113b to compress spring 114. Shaft 113a extends into guide hole 116 which maintains its axial alignment.

The flow setting is adjusted by turning knob 124 whereby threaded stem portion 122 screws in or out of the threaded bore 123. Knob 124 is pressed on to knurled spline 125 of stem 117 and is retained by riveted portion 126. Stem 117 is sealed by means of O-ring 127 in gland nut 128. Gasket 129 seals gland nut. Relief hole 134 prevents pressure build-up behind threaded stem portion 22.

Upon reversal of flow, poppet 113 carries shaft 113a and its flange 113b to the alternate position indicated by 113′, 113a′, and 113b′ and free reverse flow is permitted. The extreme travel of poppet 113 is limited by stop 113 which is contacted by flange 113b when it reaches extreme position 113b′.

While only two embodiments of this invention are shown, many other embodiments employing identical or basically similar principles may be devised. It therefore should be understood that this invention is not limited to the specific constructions shown and described except as so provided in the appended claims. Those skilled in the art will understand that changes are possible without departure from the principles set forth.

I claim:

1. A valve comprising: a body having an inlet and an outlet, a fixed bore in said body communicating with said inlet and said outlet, an unattached spherical flow restricting element in said bore, a finite effective flow area formed between said element and said bore for any position of said element along the axis of said bore, said area asymptotically approaching zero toward said outlet, a nonlinear coil spring in said body, said spring deflectable from the movement of said element toward said outlet, said element being free-floating at any axial position.

2. A valve according to claim 1 wherein said effective flow area decreases asymptotically in substantially the same ratio per unit of axial movement of said element in said bore toward said outlet, the valve also comprising an adjusting stem for said spring, said stem extending outside said body and threadably engaging said body.

3. A valve according to claim 1 wherein said effective flow area decreases asymptotically in substantially the same ratio per unit of axial movement of said element in said bore toward said outlet, the valve also comprising an adjusting stem for said spring, said stem extending outside said body through sealing means, said stem threadably engaging said body, said spring fastened to said stem.

References Cited in the file of this patent

UNITED STATES PATENTS

| | | |
|---|---|---|
| 1,904,337 | Turner | Apr. 18, 1933 |
| 1,911,450 | Kocher | May 30, 1933 |
| 2,291,881 | Coffey | Aug. 4, 1942 |
| 2,367,106 | Dolch | Jan. 9, 1945 |
| 2,400,817 | Fox et al. | May 21, 1946 |
| 2,865,398 | Popowich | Dec. 23, 1958 |
| 2,925,243 | Griswold | Feb. 16, 1960 |
| 2,925,826 | Streeter | Feb. 23, 1960 |
| 2,929,403 | Streeter | Mar. 22, 1960 |
| 2,984,261 | Kates | May 16, 1961 |

FOREIGN PATENTS

| | | |
|---|---|---|
| 140,689 | Great Britain | Apr. 1, 1920 |